(12) United States Patent
Wallin et al.

(10) Patent No.: US 9,273,881 B2
(45) Date of Patent: Mar. 1, 2016

(54) CONNECTING PIECE AND A METHOD AND TOOL FOR ITS MANUFACTURE

(75) Inventors: Peter Wallin, Kalmar (SE); Göran Bernhardsson, Båstad (SE); Andreas Wallin, Kalmar (SE)

(73) Assignee: Climate Recovery Ind. AB, Kalmar (SE)

( * ) Notice: Subject to any disclaimer, the term of this patent is extended or adjusted under 35 U.S.C. 154(b) by 369 days.

(21) Appl. No.: 13/511,252

(22) PCT Filed: Nov. 23, 2010

(86) PCT No.: PCT/EP2010/068009
§ 371 (c)(1),
(2), (4) Date: May 22, 2012

(87) PCT Pub. No.: WO2011/064198
PCT Pub. Date: Jun. 3, 2011

(65) Prior Publication Data
US 2013/0020798 A1    Jan. 24, 2013

(30) Foreign Application Priority Data
Nov. 24, 2009  (SE) ...................................... 0901483

(51) Int. Cl.
F16L 47/00    (2006.01)
F24F 13/02    (2006.01)

(52) U.S. Cl.
CPC ......... *F24F 13/0209* (2013.01); *F24F 13/0236* (2013.01); *Y10T 29/4998* (2015.01); *Y10T 29/53* (2015.01)

(58) Field of Classification Search
CPC .......................... F24F 13/0209; F24F 13/0236
USPC .............. 285/417, 423, 369, 371, 373, 290.3, 285/290.1, 55; 138/170; 29/463, 282
See application file for complete search history.

(56) References Cited

U.S. PATENT DOCUMENTS

| | | | | |
|---|---|---|---|---|
| 3,340,714 A * | 9/1967 | Pohl et al. | ...................... | 264/292 |
| 3,423,816 A * | 1/1969 | Grosh et al. | ..................... | 29/463 |
| 3,563,276 A * | 2/1971 | High et al. | ..................... | 285/373 |
| 3,825,392 A * | 7/1974 | Ligon et al. | ..................... | 264/322 |
| 4,183,557 A * | 1/1980 | Hinden | ........................... | 285/53 |

(Continued)

FOREIGN PATENT DOCUMENTS

WO    2005038330 A1    4/2005

OTHER PUBLICATIONS

JP 9243156 A (Tokushu Paper MFG co Ltd) Sep. 16, 1997 abstract figures.

(Continued)

*Primary Examiner* — David E Bochna
(74) *Attorney, Agent, or Firm* — WRB-IP LLP

(57) ABSTRACT

A connecting piece for a duct such as a ventilation duct is provided and includes an inner flow space in communication with the interior of the duct, the connecting piece having at least one joining portion on which an end region of the duct is slidable and fixable. The connecting piece includes a compressed fiber material and a binder. The connecting piece displays a substantially configurationally stable portion in association with the joining portion, and the connecting piece displays, at least interiorly, a layer which is impervious to a fluid, in particular a gas, this layer being adjacent the inner flow space of the connecting piece.

13 Claims, 6 Drawing Sheets

(56) References Cited

U.S. PATENT DOCUMENTS

| | | | | |
|---|---|---|---|---|
| 4,301,584 A | * | 11/1981 | Dillner et al. | 29/423 |
| 4,371,494 A | * | 2/1983 | Miller | 29/463 |
| 4,488,739 A | * | 12/1984 | de Lange | 285/55 |
| 4,519,637 A | * | 5/1985 | Folkers | 285/371 |
| 4,900,064 A | * | 2/1990 | Lyons et al. | 285/53 |
| 4,925,218 A | * | 5/1990 | Kunz et al. | 285/373 |
| 4,939,923 A | * | 7/1990 | Sharp | 285/373 |
| 5,007,666 A | * | 4/1991 | Kyfes | 285/373 |
| 5,033,775 A | * | 7/1991 | Matte et al. | 285/423 |
| 5,039,134 A | * | 8/1991 | Meadows et al. | 285/423 |
| 5,411,300 A | * | 5/1995 | Mitsui | 285/371 |
| 5,480,196 A | * | 1/1996 | Adams, Jr. | 285/369 |
| 5,507,532 A | * | 4/1996 | Mitsui | 285/423 |
| 5,566,984 A | * | 10/1996 | Abbema et al. | 285/55 |
| 7,501,099 B2 | * | 3/2009 | Sanocki et al. | 422/179 |
| 7,614,270 B2 | * | 11/2009 | Luckey et al. | 29/421.1 |
| 7,866,535 B2 | * | 1/2011 | Eilert et al. | 428/542.8 |
| 8,128,126 B2 | * | 3/2012 | Poupore et al. | 285/373 |
| 2006/0279084 A1 | * | 12/2006 | Collins | 285/328 |

OTHER PUBLICATIONS

JP2004336962 A (Furukawa Electric co Ltd; Kyowa Rubber KK) Nov. 25, 2004 abstract; figures.
JP2007113803 A (Shin Nippon Air Tech Co Ltd; Fujimori Sangyo) May 10, 2007 abstract; figures.
International Search Report for corresponding International application No. PCT/EP2010/068009 dated Feb. 3, 2009.

* cited by examiner

CONNECTING PIECE AND A METHOD AND TOOL FOR ITS MANUFACTURE

BACKGROUND AND SUMMARY

The present invention relates to a connecting piece for a duct, preferably a ventilation duct, and comprising an inner flow space in communication with the interior of the duct, the connecting piece having at least one joining portion on which an end region of the duct is slidable and fixable.

The present invention also relates to a method of manufacturing a connecting piece intended for a duct, which is provided with an inner flow space and at least one joining portion for cooperation with the duct.

Finally, the present invention relates to a tool for manufacturing a connecting piece for a duct, and comprising a female union with a concave forming surface, the forming surface corresponding to the configuration of the outside of a shell body which forms part of the connecting piece, and a male union with a convex forming surface corresponding to the configuration of the inside of the shell body.

International Application PCT/SE2009/000281 discloses a ventilation duct which is produced from a compressed fiber material with a minor admixture of binder. The duct has longitudinal flexural lines in the corner regions, while the walls of the duct have transverse pivotal portions, rigidifying portions and relatively soft portions so that, in the unloaded or unstressed state, the duct displays a rectangular, possibly square cross section and is self-supporting across considerable lengths, up to between 2 and 3 m. Further, the duct is slightly flexible as a result of the presence of the relatively soft portions in the walls of the duct.

In one variation of the above-described duct, the duct has, on two opposing sides, been provided with longitudinal fold lines so that the cross-sectional configuration of the duct may thereby be modified from rectangular to hexagonal configuration. As a result, two opposing sides will be approximately twice as wide as the remaining four sides. Further, the cross-sectional configuration may vary so that it will be more or less flattened.

For interconnecting and joining duct sections of the above-outlined types, different types of connecting pieces are required, which may be straight connecting pieces of varying lengths, T-junctions, bends with different angles of curvature and radii, etc.

Those connecting pieces that are previously known in the art have been intended for ventilation ducts manufactured from sheet-metal material and consist of or comprise the same material themselves. This implies high manufacturing costs, often requirements on external insulation given the risk of condensation and needs for fire protection, and also probably considerable assembly- and sealing problems if they were to be used together with the above-described duct types.

It is desirable to design the connecting piece intimated by way of introduction such that it may be manufactured at low cost, that it inherently possesses a superior insulation property, that there are no fire hazards, and that simple assembly may be put into effect.

It is also desirable to design the method intimated by way of introduction such that the advantages inherent in the thus manufactured connecting piece will be attained.

It is also desirable to design the tool intimated by way of introduction such that it permits simple, rapid and economical manufacture, as well as adjustment of the tool for the manufacture of connecting pieces of different designs.

According to an aspect of the present invention, a connecting piece intimated by way of introduction is characterised in that the connecting piece includes a compressed fiber material and a binder, that the connecting piece displays a substantially configurationally stable portion in association with the joining portion, and that the connecting piece displays, at least interiorly, a layer which is impervious to a fluid, in particular a gas, this layer being adjacent the inner flow space of the connecting piece.

According to another aspect of the present invention, a method comprises the steps that two mirror-symmetric, possibly continuous shell bodies are produced by compression of a fiber material and a binder, that the shell bodies are provided with substantially configurationally stable portions in association with those portions that, in the finished state of the connecting piece, are to form the joining portion, that the shell bodies, at least on that side which, in the finished state of the connecting piece, is turned to face towards the flow space, is provided with a layer which is impervious to a fluid, in particular a gas, and that the shell bodies are united together.

According to yet another aspect of the present invention, a tool is characterised in that the forming surfaces are composed of edge surfaces on lamellae which are included in the female union and the male union.

BRIEF DESCRIPTION OF THE ACCOMPANYING DRAWINGS

The present invention will now be described in greater detail hereinbelow, with particular reference to the accompanying Drawings. In the accompanying Drawings.

DESCRIPTION OF PREFERRED EMBODIMENT

The present invention will be described hereinbelow as being in the form of a connecting piece, but it will be obvious to the skilled reader that the technology described below is just as advantageously applicable in the manufacture of longer connecting pieces or duct sections.

Figure 1:
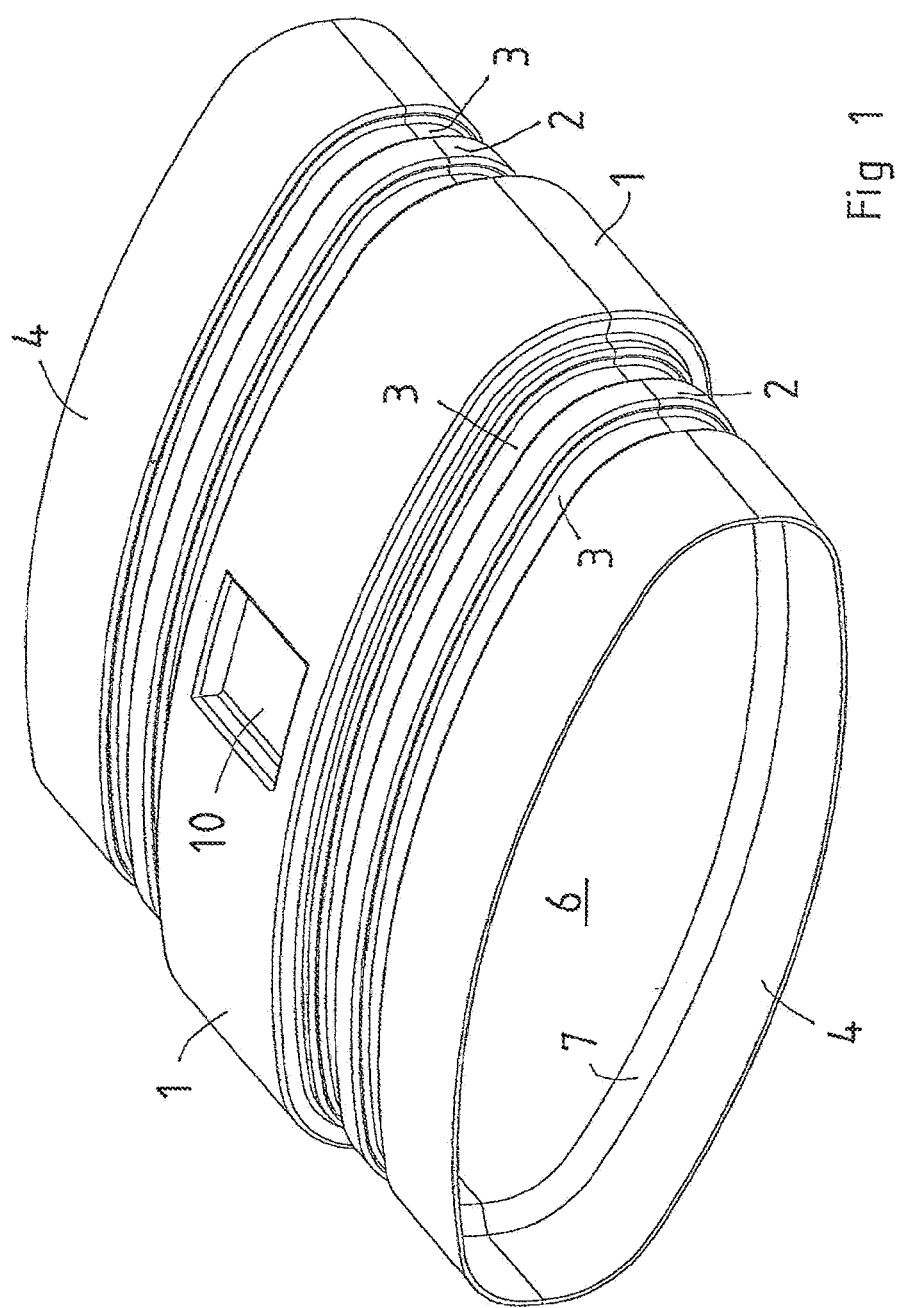
FIG. 1 shows a first embodiment of a straight connecting piece according to the present invention.

As will be apparent from the Figure, the connecting piece according to FIG. 1 has an oval, possibly elliptic cross section, which more or less approximates the configuration of the duct described by way of introduction displaying hexagonal cross section. The cross-sectional configuration may be more or less elongate and narrow, and thus deviate from the illustrated configuration both in a rounder direction and in a flatter direction. Further, the oval cross section is advantageous given that the internal mounting dimensions for a connecting piece designed in this manner will be smaller than would otherwise be the case. Naturally, this by no means prevents a duct of the type described by way of introduction from having a rectangular cross section throughout large longitudinal sections while, on the other hand, the cross section is reconfigured to hexagonal configuration at those portions where the connecting pieces are to be mounted.

If the connecting piece is intended for cooperation with a ventilation duct which only displays rectangular, possibly square cross section, the cross section of the connecting piece may instead be rounded, possibly circular.

The connecting piece according to FIG. 1 is manufactured from a fiber material, for example glass fiber or mineral wool, which has a minor admixture of a binder which may be activated by heating. Hereby, the connecting piece will, depending on the degree of compression of the fiber material, be able to be given different properties in different parts. Thus, the connecting piece according to FIG. 1 has a central portion, which is a substantially configurationally stable portion 1 and which contains a considerably greater quantity of fibers per surface unit that is the case for the remaining portions of the connecting piece. On either side of the substantially configurationally stable portion 1, the connecting piece has at least one but preferably two joining portions 2 which are intended for joining of end portions of a duct 5 (see FIG. 5) of both of the types that were described by way of introduction. For sealing against such a duct 5, the joining portions display circumferential recesses 3. (seen particularly clearly in FIG. 5), these recesses 3 being intended for accommodating suitable sealing rings or gaskets.

Finally, the connecting piece displays, adjacent the joining portions 2, entry portions 4 which may be deformed under quite slight loads and which display considerably lesser material thickness than both the joining portions 2 and the configurationally stable portion 1. The material thickness of the entry portions may lie in the order of magnitude of between 1 and 2 mm, while the material thickness in the joining portions 2, apart from the recesses 3, may lie in the order of magnitude of between 3 and 6 mm, while finally the material thickness of the substantially configurationally stable portion 1 may lie in the order of magnitude of between 10 and 15 mm.

For reasons of fire safety, it is important that the quantity of combustible binder is kept as low as possible. Nevertheless, it may be conceivable to employ different concentrations of binder in the entry portions 4, the joining portions and in the substantially configurationally stable portion 1. In particular, the concentration may be increased in the substantially configurationally stable portion 1 and possibly also in the joining portions 2.

According to the present invention, the degree of compression is considerably higher in the substantially configurationally stable portion 1 than is the case in both the joining portions 2 and the entry portions 4, which is achieved in that considerably more fibers are compressed in the substantially configurationally stable portion than in the remaining portions of the connecting piece. Thus, that layer of uncompressed fibers which is to form the substantially configurationally stable portion 1 may amount to 10-20 cm, while considerably thinner layers are employed for the joining portions 2 and the entry portions 4. As a norm for the compression pressure, mention might be made of approx. 10 kp/cm$^2$.

Figure 2:
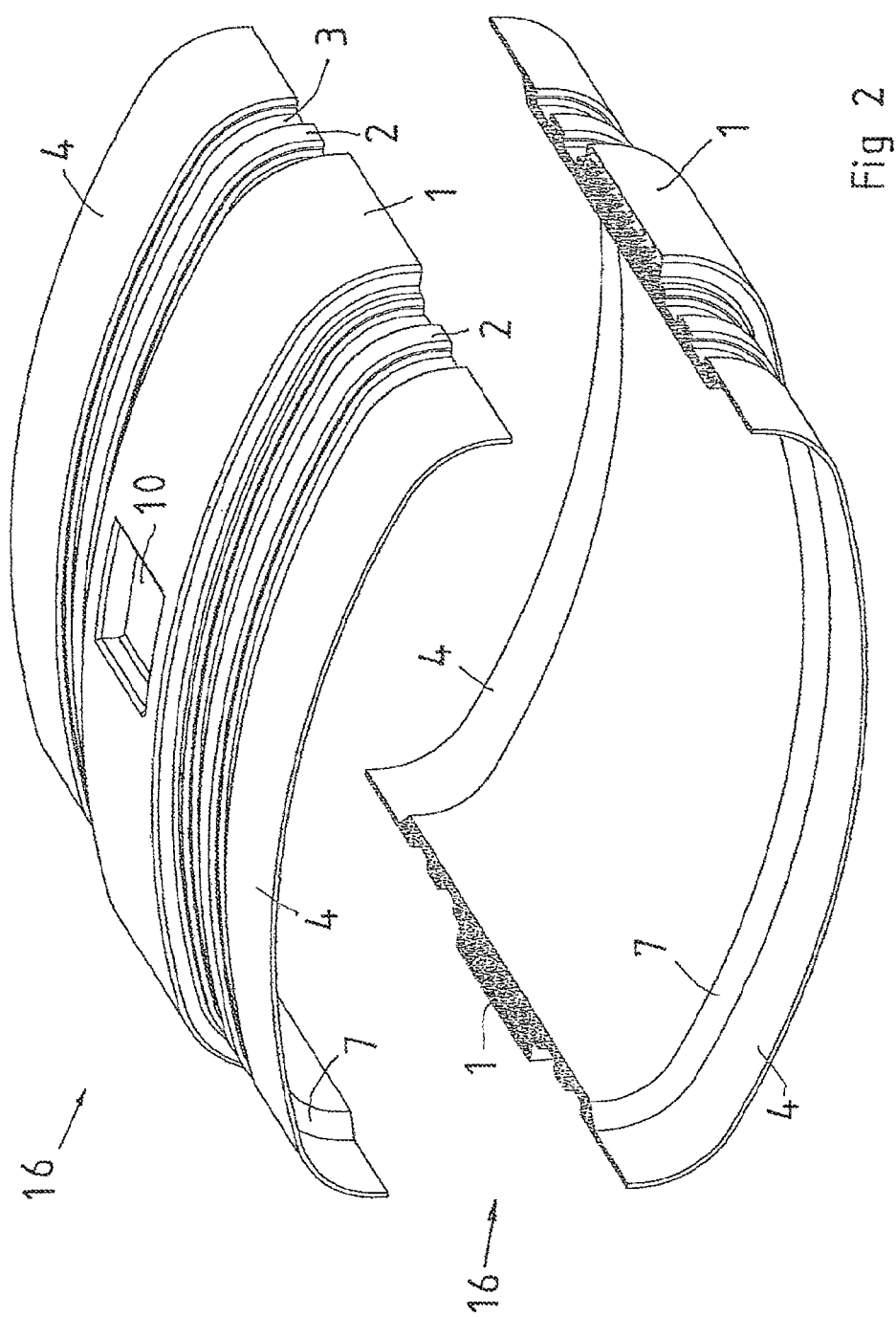
FIG. 2 shows two shell bodies which together form the connecting piece according to FIG. 1.
Figure 5:
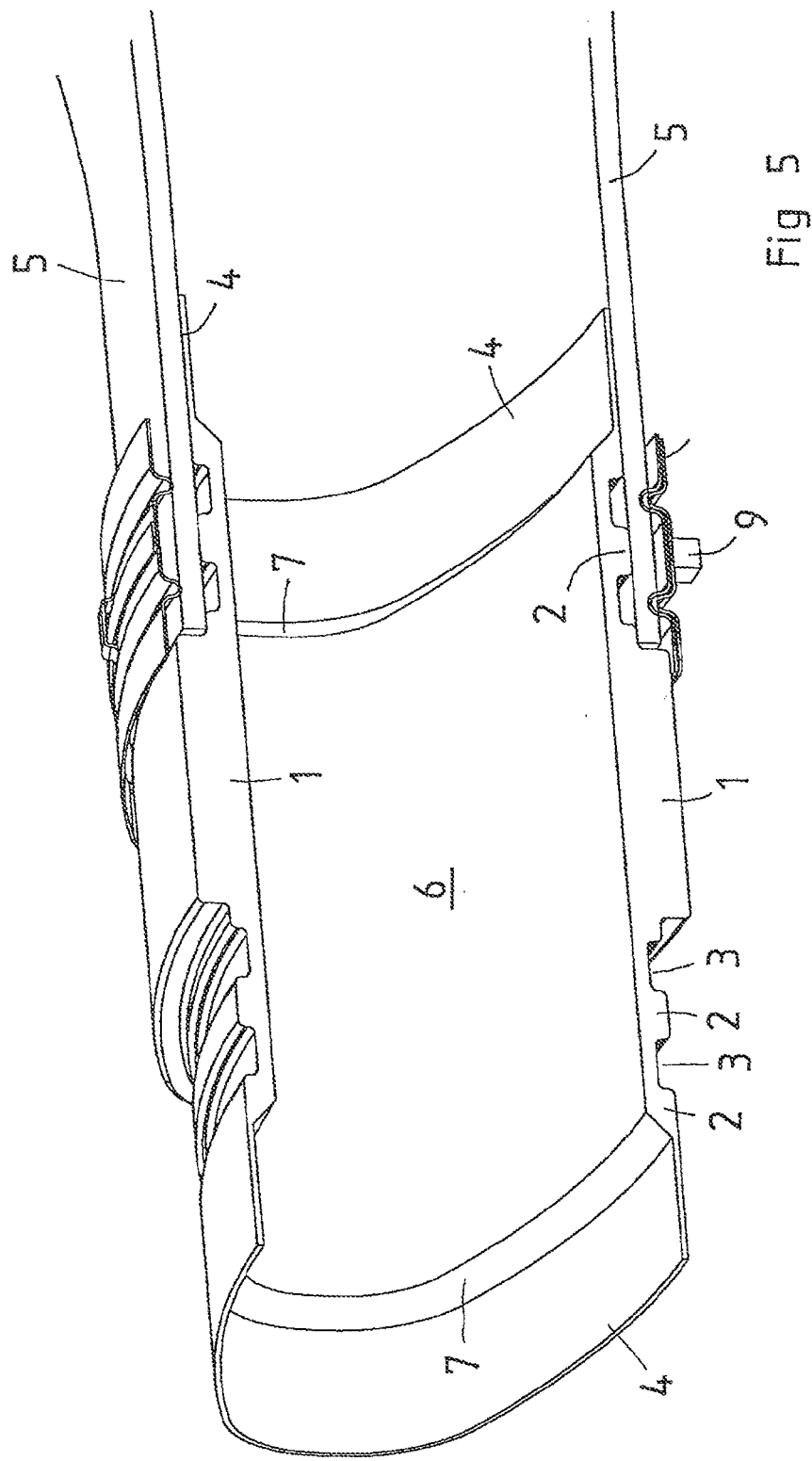
FIG. 5 is a longitudinal section through a connecting piece according to FIG. 1 and a duct section mounted thereon.

It will be apparent from FIGS. 2 and 5 that the connecting piece has an inner flow space which is in flow communication with that duct section 5 which is intimated to the right in FIG. 5. This flow space has been given reference numeral 6 in the Figures. It will be apparent from the Figures that the flow space 6 has a smooth contour over those parts of the connecting piece which consist of or comprise the substantially configurationally stable portion 1 and the two joining portions 2. Those differences in material thickness which exist between these portions are thus realised on the outside of the connecting piece. Such a smooth contour is advantageous in terms of simple cleaning of the interior of the connecting piece.

On the other hand, the transition between the entry portions 4 and the two joining portions 2 takes place on the inside of the connecting piece so that there is formed therebetween an obliquely inclined transitional surface 7. It will further be apparent from the Drawing that the outside of the entry portions 4 lies flush with the outside of the two joining portions 2 so that the duct 5 will thereby have a smooth outside to abut against, apart from those grooves or recesses 3 which are intended for sealings.

It will be apparent from FIG. 5 that, exteriorly on the duct section 5, there is disposed a clamp 8 which, in the axial direction of the connecting piece, is of a width which approximately corresponds to the width of the joining portion 2. Further, the clamp 8 displays inward bulges in register with the recesses 3, these bulges being intended to clamp with particular force on the areas of the duct section located there, into sealing abutment against the sealing rings or gaskets disposed in the recesses 3. The clamp 8 may be manufactured from sheet metal and be open so that it is drawn together under the action of a suitable clamping means, such as a bundle tie 9 or the like.

In FIG. 2, which shows two shell bodies 16 which together form the connecting piece according to FIG. 1, it is clearly apparent how the shell bodies are produced from fiber material. The shell bodies 16 are identical or mirror-symmetric, and are manufactured in the same tool, for which reason just a simple joining together of the two shell bodies needs to take place before a complete connecting piece is realised.

On mounting of a duct 5 on a connecting piece, use is made of a shoehorn-like took, by means of which the entry portion 4 is deformed so that it may readily be passed into the duct 5. Even if the duct 5 is of limited deformability, it should in this context be considered as inflexible in the circumferential direction.

According to the present invention, the connecting piece according to the present invention displays, at least on its inside, a layer which is impervious to a fluid, in particular a gas, and which may, for example, consist of or comprise a foil of suitable plastics material. Preferably, the outside of the connecting piece, at least on the joining portions 2 and the entry portions 4, has a corresponding layer that is impervious to a gas. This layer may be formed as an adhesive sealing layer which bonds to the outside of the duct 5. In such an embodiment, no grooves or recesses 3 and no separate sealing rings or gaskets are necessary. The reverse procedure is also possible, i.e. to place the adhesive sealing layer interiorly in the duct 5.

Figure 3:
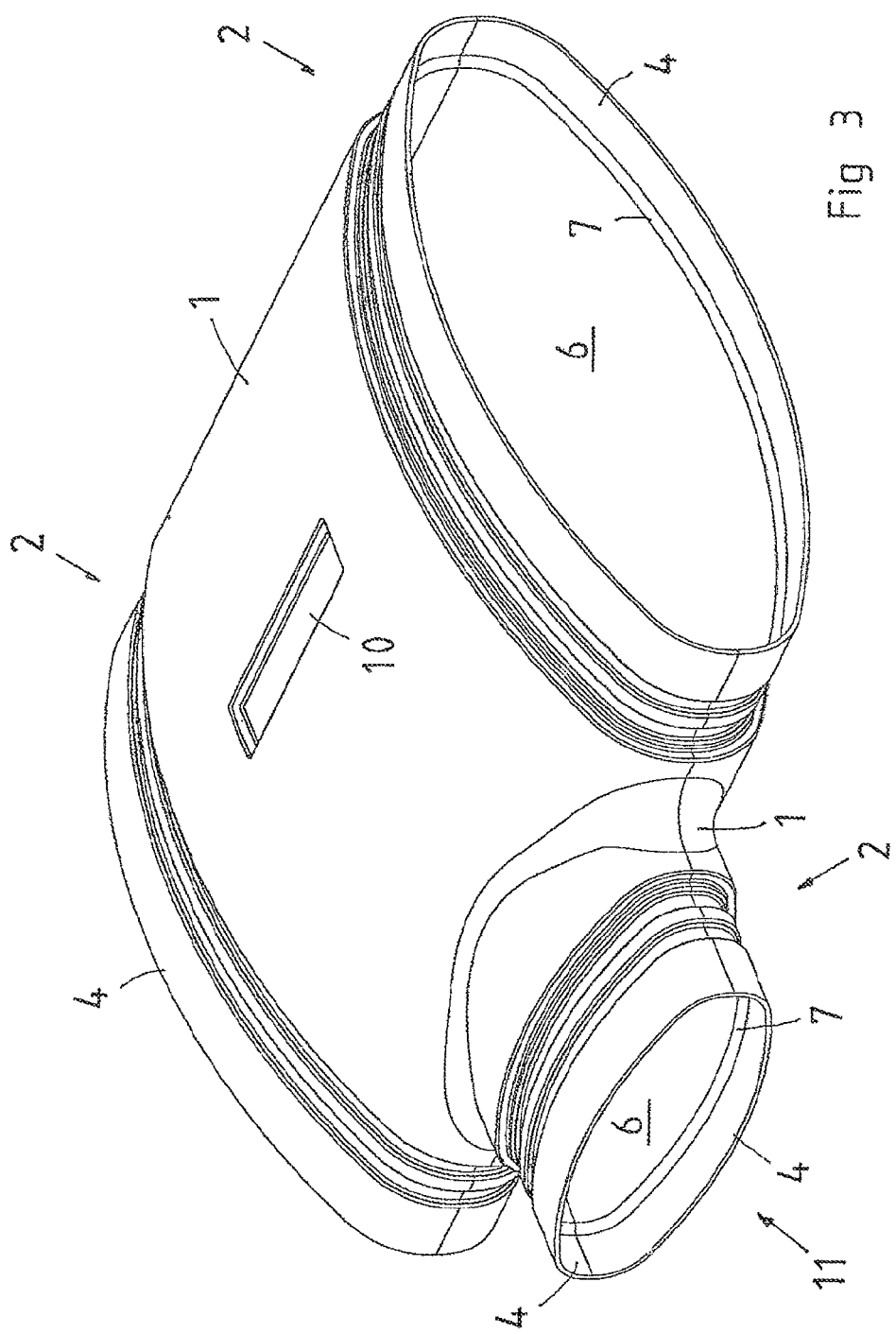
FIG. 3 shows a connecting piece formed as a T-junction.
Figure 4:
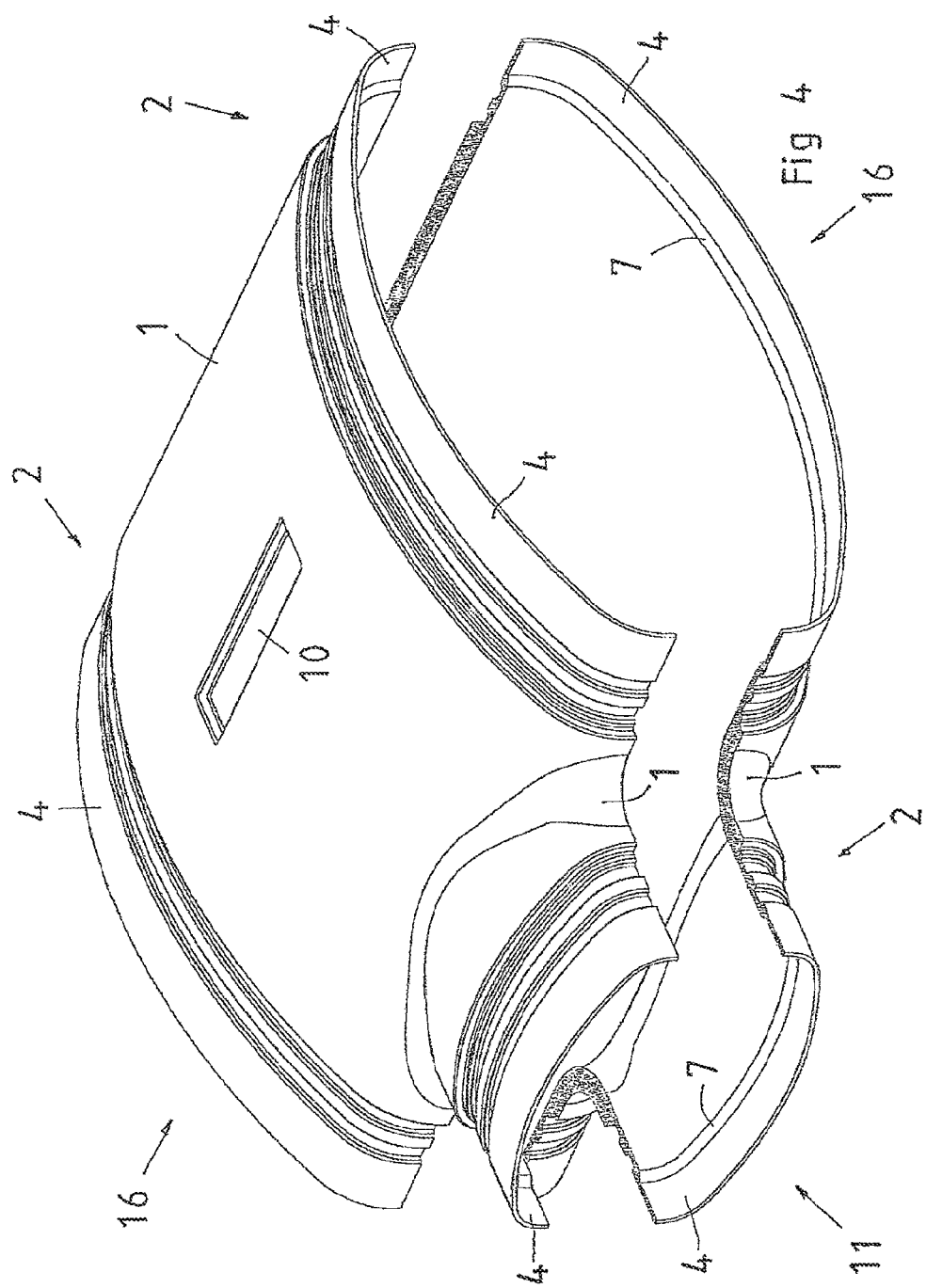
FIG. 4 shows two shell bodies which together form the T-junction according to FIG. 3.

If will further be apparent from the Drawings that the connecting piece, in the substantially configurationally stable portion 1, may be provided with a depression 10, with a locally reduced material thickness, for cooperation with a suspension clip or the like. FIGS. 3 and 4 show a connecting piece formed as a T-junction, as well as both of the shell bodies 16 from which such a connecting piece is formed. This T-junction also displays, in its central region, a substantially configurationally stable portion 1 of considerably greater material thickness than is the case for the remainder of the T-junction. A branch connection 11 is, in the illustrated embodiment, connected at right angles to the connecting piece, but may naturally display another connection angle. It will further be apparent that the branch connection 11 has an entry portion 4 and a joining portion 2. It will also be apparent that the branch connection 11 also has a substantially configurationally stable portion which is preferably of one piece manufacture with the substantially configurationally stable portion on the main part of the connecting piece.

Finally, it will be apparent from FIGS. 3 and 4 that the branch connection 11 is of smaller dimensions than is the case for the connecting piece at large. Thus, the branch connection 11 is dimensioned for a smaller duct than is the case for the rest of the connecting piece proper.

FIGS. 1 to 4 show two different embodiments of a connecting piece according to the present invention. However, the present invention encompasses connecting pieces of different designs, which may be formed as bends, both vertical and horizontal, with different radii of curvature and different angles of curvature. Further, the connecting piece may be in the form of a cross connection, thus an embodiment similar to the embodiment according to FIGS. 3 and 4 where an additional branch connection is provided. The connecting piece may display a change in surface area.

On manufacture of a connecting piece according to the present invention, two shell bodies 16 are first manufactured, which may be contiguous together along a fold line, so that a finished connecting piece may be realised by folding together of the shell bodies splayed out on manufacture. Alternatively, the shell bodies may be completely separate and be joined together in a subsequent process. In order for this to be possible, the shell bodies are identical or mirror-symmetric.

As was intimated above, manufacture takes place by a pressing process where layers of fiber material of different thicknesses are compressed together in a tool to the intended final form of the shell body 16. Preferably, the fiber material is pre-heated in a pre-heating oven so that any possible moisture disappears before the actual pressing operation takes place in the press tool where the temperature is raised sufficiently for activation of the binder which is admixed in the fiber material.

Manufacture of the connecting piece may also take place in that layers of fiber material of different thicknesses are wound on or wrapped around a core which may consist of or comprise a plurality of part cores, whereafter the fiber material is compressed from the outside by a number of press jaws simultaneously as heat is supplied.

Figure 6:
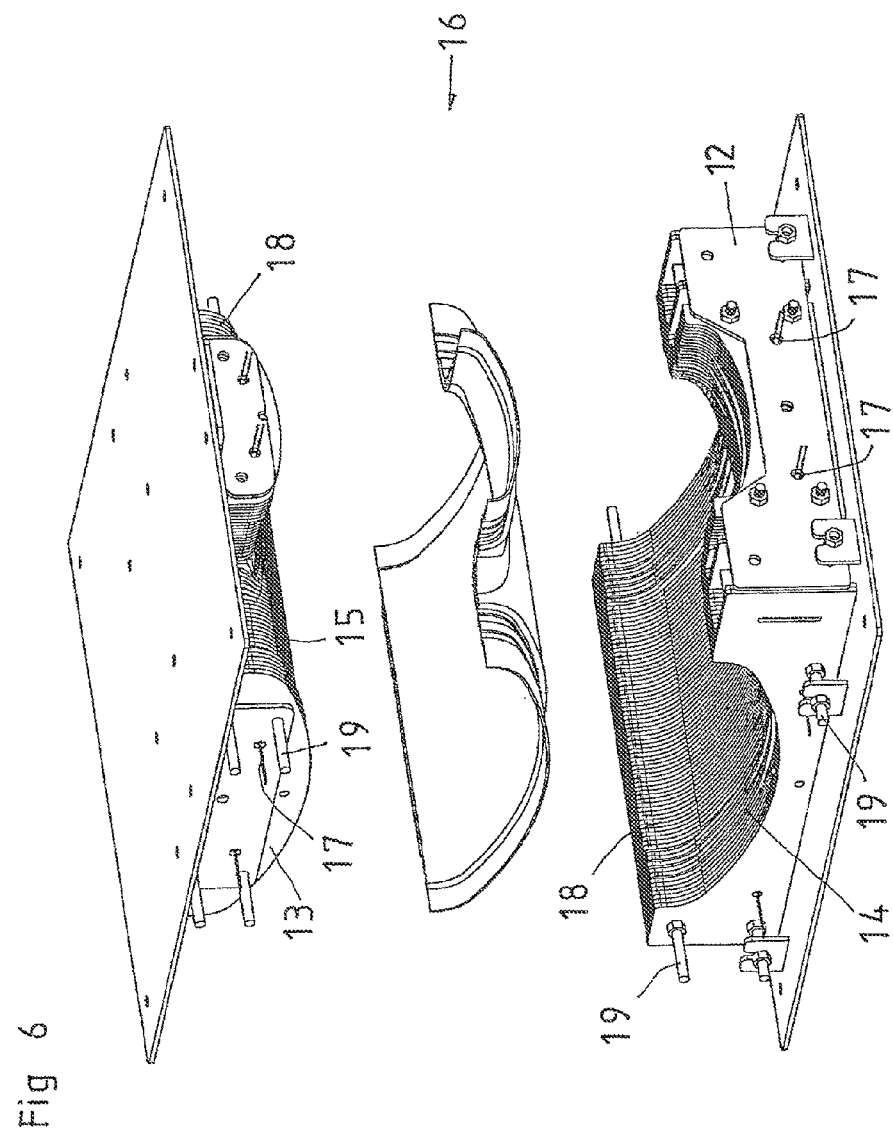
FIG. 6 shows a tool for manufacturing a T-junction according to FIGS. 3 and 4.

FIG. 6 shows one example of a tool designed for manufacture of a connecting piece according to the present invention, formed as a T-junction. The tool comprises a female union 12 and a male union 13 which both have forming surfaces 14 and 15, respectively, and it is these forming surfaces that will impart the form to the shell body 16 produced in the tool. On manufacture of the shell body 16 according to FIG. 6, the binder-admixed fiber material is preferably placed in the female union 12 of the tool, with considerably more fibers in that part of the tool which is to form the substantially configurationally stable portion 1 of the connecting piece. Correspondingly, a lesser quantity of fibers is placed in that part which is to form the joining portions 2 of the connecting piece and yet again a lesser quantity of fibers is placed in that part of the tool which is to form the entry portions 4 of the connecting piece. Thereafter, the tool is closed in a pressing movement, at the same time as the tool is kept hot with the aid of the heating device 17 so that the temperature of the tool may be kept at a level which is sufficient for activation of the binder admixed in the fiber material.

It will be apparent from FIG. 6 that the tool, both the female union 12 and the male union 13, is produced from a number of slats or lamellae 18 laid side-by-side in a package. These lamellae are held together by means of tie rods 19 or other suitable types of clamping devices.

As a result of the design of the female union 12 and the male union 13 as packages of lamellae, it will be the edge surfaces of the lamellae which will makeup the forming surfaces 14 and 15 in the tool. The design of the tool as a package of slats or lamellae also entails that certain lamellae may readily be replaced, and thereby the shape of the tool be changed so that the greater part of the tool may be employed for manufacture of several different designs of the connecting piece.

Given that the tool includes a large number of lamellae 18, it is possible to dispose, between at least certain of them, channels for removing gases or for the supply of hot air on activation of the binder.

The present invention should not be considered as restricted to that described above and shown on the Drawings, many modifications being conceivable without departing from the scope of the appended Claims.

What is claimed is:

1. A connecting piece for a duct, comprising an inner flow space in communication with the interior of the duct, the connecting piece having at least one joining portion on which an end region of the duct is slidable and fixable, the connecting piece displaying a substantially configurationally stable portion in association with the joining portion, wherein the connecting piece includes a compressed fiber material and a binder in both the configurationally stable portion and the joining portion and the connecting piece displays, at least interiorly, a layer which is impervious to a fluid, this layer being adjacent the inner flow space of the connecting piece, wherein the quantity of fiber material per surface area in the connecting piece is greater in the substantially configurationally stable portion than in the joining portion, and the material thickness in the configurationally stable portion is greater than in the joining portion.

2. The connecting piece as claimed in claim 1, wherein the flow space of the connecting piece displays an oval or elliptical cross section.

3. The connecting piece as claimed in claim 1, wherein the flow space of the connecting piece displays a substantially rounded cross section.

4. The connecting piece as claimed in claim 1, wherein the joining portion displays, along its edge facing away from the configurationally stable portion, a flexible entry portion of lesser material thickness than the remainder of the joining portion.

5. The connecting piece as claimed in claim 1, wherein the joining portion has at least one seat for accommodating a sealing.

6. The connecting piece as claimed in claim 1, wherein the connecting piece is a straight or curved connecting piece, with the configurationally stable portion in the center and with a joining portion on either side thereof.

7. The connecting piece as claimed in claim 1, wherein the connecting piece is a T-junction with a straight portion and a lateral portion, the straight portion having the substantially configurationally stable portion in the center, with a joining portion on either side thereof, and the lateral portion having, between its joining portion and the straight portion, a substantially configurationally stable portion.

8. The connecting piece as claimed in claim 7, wherein the substantially configurationally stable portions of the lateral portion and the straight portion are continuous.

9. A method of manufacturing a connecting piece intended for a duct, having an inner flow space and at least one joining portion for cooperation with the duct, comprising
producing two mirror-symmetric shell bodies by compression of a fiber material and a binder,
giving the shell bodies substantially configurationally stable portions in association with those portions which, in a finished state of the connecting piece, are to form the joining portion, providing the shell bodies, at least on sides thereof which, in the finished state of the connecting piece, are turned to face towards the flow space, with a layer impervious to a fluid, and joining the shell bodies together, wherein a quantity of fiber material per surface area in the connecting piece is greater in the substantially configurationally stable portion than in the joining portion, and the material thickness in the configurationally stable portion is greater than in the joining portion.

10. The method as claimed in claim 9, wherein the flow space of the connecting piece is given an oval cross section.

11. The method as claimed in claim 9, wherein the flow space is given a substantially rounded cross section.

12. The method as claimed in claim 9, wherein the quantity of fiber material per surface unit in the substantially configurationally stable portions of the shell bodies is made greater than the quantity of fiber material per surface unit in those portions which, in the finished state of the connecting piece, are to form the joining portion.

13. The method as claimed in claim 9, wherein those portions of the shell bodies which, in the finished state of the connecting piece, are to form the joining portion, are provided, on their sides facing away from the substantially configurationally stable portions, with flexible portions which, in the finished state of the connecting piece, are to form an entry portion to the connecting piece.

\* \* \* \* \*